No. 779,596. PATENTED JAN. 10, 1905.
G. F. HAILMAN.
HORSESHOE CALK.
APPLICATION FILED JAN. 5, 1904.
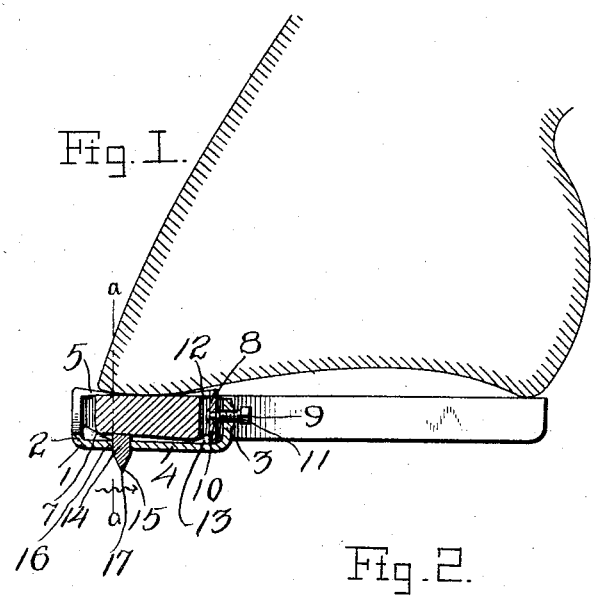
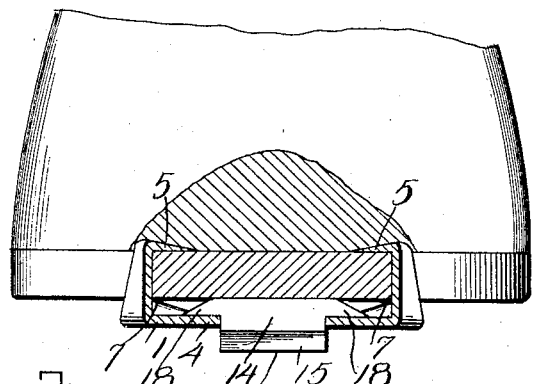
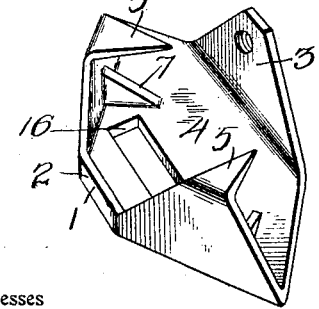
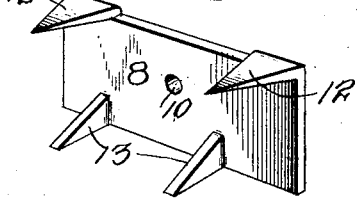
Witnesses
E. H. Reichenbach.
Inventor
Geo. F. Hailman.
By H. B. Willson,
Attorney No. 779,596.

Patented January 10, 1905.

UNITED STATES PATENT OFFICE.

GEORGE F. HAILMAN, OF WASHINGTON, DISTRICT OF COLUMBIA, ASSIGNOR TO AMERICAN HORSE SHOE GRIP COMPANY, INCORPORATED, A CORPORATION OF THE DISTRICT OF COLUMBIA.

HORSESHOE-CALK.

SPECIFICATION forming part of Letters Patent No. 779,596, dated January 10, 1905.

Application filed January 5, 1904. Serial No. 187,850.

*To all whom it may concern:*

Be it known that I, GEORGE F. HAILMAN, a citizen of the United States, residing at Washington, in the District of Columbia, have invented certain new and useful Improvements in Horseshoe-Calks; and I do declare the following to be a full, clear, and exact description of the invention, such as will enable others skilled in the art to which it appertains to make and use the same.

My invention is an improved horseshoe-calk adapted to be readily attached to and detached from a horseshoe; and it consists of the construction, combination, and arrangement of devices hereinafter described and claimed.

The object of my invention is to provide an improved device of this character which will enable a horse to be provided with sharp calks during cold weather to prevent him from slipping on the ice, and which calks may be readily removed when the necessity for wearing them no longer exists, and may be readily renewed when they become worn.

In the accompanying drawings, Figure 1 is a sectional view of a horseshoe-calk embodying my improvements, showing the same attached to a horseshoe. Fig. 2 is a sectional view of the same, taken on a plane indicated by the line *a a* of Fig. 1. Fig. 3 is a detail perspective view of the outer clamp. Fig. 4 is a similar view of the inner clamp.

My invention is here shown as a toe-calk. It may be also used as a heel-calk by a slight modification of the shape of the outer and inner frames to enable them to fit the heel portions of the horseshoe.

In the embodiment of my invention I provide an outer clamp 1, which is adapted to receive the toe or heel portion of the horseshoe, and comprises a front wall 2 and a rear wall 3 and a connecting bottom portion or web 4. At the upper side of the front wall 2 are formed inturned flanges 5, which are tapered in form cross-sectionally, as shown, to adapt them to be inserted between the hoof and the upper edge of the horseshoe. Two or more ribs 7, having inclined upper edges, are provided, which rise from the bottom of the outer clamp and extend to the front wall thereof. By thus providing the said ribs with inclined upper edges the same are rendered wedge-shaped, so that the front edge of the horseshoe may be effectually gripped between them and the flanges 5 irrespective of the width or depth of the horseshoe and the extent to which it may be worn.

The inner clamp 8 is disposed on the inner side of the rear wall 3 and is connected thereto by a set-screw 9, which is swiveled to the inner clamp, as at 10, and is provided with an angular head 11 or other suitable device, whereby it may be readily turned by a wrench or key to adjust the inner clamp.

The threaded stem of the screw operates in the screw-threaded opening of the rear wall 3 of the outer clamp. The inner clamp is provided at its upper corners with inwardly-extending wedge-shaped flanges 12, which are adapted to engage the upper side of the rear or inner edge of the horseshoe and to fit between the same and the hoof, as shown. The inner clamp is provided at its lower side at a suitable distance apart with a plurality, two or more, of wedge-shaped ribs 13, which bear under the lower edge of the horseshoe and against the bottom of the outer clamp.

It will be understood from the foregoing and by reference to Fig. 1 of the drawings that by adjusting the screw 9 the inner clamp may be moved toward or from the horseshoe, so as to cause the latter to be firmly gripped between the flanges 5 and wedge-shaped ribs 7 of the outer clamp and the flanges 12 and ribs 13 of the inner clamp.

The calk 14 is preferably of the form shown in detail in Fig. 2, having a blade 15, adapted to fit in an opening 16 in the bottom of the outer clamp, having its lower edge beveled to a cutting edge, as at 17, and provided at its upper corners with projecting shoulders 18, which overhang and bear upon the bottom of the outer clamp. These shoulders also bear against the under side of the horseshoe, the latter serving to securely hold the calk in place. It will be understood that by first removing the outer and inner clamps the calk may be readily removed and resharpened when it becomes dulled or replaced by a new one at very slight expense when it becomes worn.

The entire device may be readily detached from the horseshoe, if desired.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A device of the class described, comprising an outer clamp, an inner clamp, each having means to engage the upper side of a horseshoe, and wedge-acting means to engage the lower side thereof, means to adjust the clamps and secure them when adjusted, and a calk carried by one of the clamps.

2. A device of the class described, comprising an outer clamp having an opening in the bottom thereof, an inner clamp, each of said clamps having means to engage the upper side of a horseshoe and wedge-acting means to engage the lower side thereof, means to adjust the clamps and secure them when adjusted, and a calk, carried by the outer clamp, extending through the opening in the bottom thereof and having shoulders overhanging and bearing thereon.

3. A device of the class described comprising a pair of clamps to engage the inner and outer sides of the horseshoe, and having wedge-acting devices to engage the upper and lower sides of the horseshoe irrespective of the depth thereof, means to adjust the clamps and secure them when adjusted, and a calk carried by one of the clamps.

In testimony whereof I have hereunto set my hand in presence of two subscribing witnesses.

GEO. F. HAILMAN.

Witnesses:
BENJ. E. COWL,
CLAYTON G. BIRCH.